United States Patent [19]

Faust

[11] 3,868,569

[45] Feb. 25, 1975

[54] APPARATUS AND METHOD FOR DISTINGUISHING BETWEEN ENERGIZED AND INDUCED VOLTAGES ON HIGH VOLTAGE POWER LINES

[76] Inventor: Carl H. Faust, Berks & Morris Rd, R.D. 2, Lansdale, Pa. 19446

[22] Filed: May 8, 1973

[21] Appl. No.: 358,295

[52] U.S. Cl. ................ 324/126, 324/149, 324/156
[51] Int. Cl. ....................... G01r 1/30, G01r 1/06
[58] Field of Search .......... 324/126, 109, 149, 156; 174/73 R

[56] References Cited
UNITED STATES PATENTS
1,868,962  7/1932  Atkinson .................... 174/73 R FOREIGN PATENTS OR APPLICATIONS
626,600   2/1936  Germany ..................... 324/126
891,965   3/1944  France ....................... 324/126
656,983   2/1938  Germany ..................... 324/126
712,764   10/1931 France ....................... 324/126

Primary Examiner—Alfred E. Smith
Assistant Examiner—Ernest F. Karlsen
Attorney, Agent, or Firm—Paul & Paul

[57] ABSTRACT

Apparatus for detecting whether a conductor at high voltage is energized or is carrying induced voltage only, comprising an elongated tube having an electrical contact on a first end for contacting the conductor, a string of high voltage capacitors connected in series running substantially the length of such tube, means for making a connection to ground, and a milliammeter positioned at the other end of the tube and connected between ground and the string of capacitors. The device is characterized by an expulsion cap which is easily expelled from said tube upon gas build up within the tube due to capacitor burn out. Relatively high current readings are obtained when the tested line is directly energized, the lines carrying induced voltage only producing relatively low current indications.

1 Claim, 3 Drawing Figures

PATENTED FEB 25 1975 3,868,569

APPARATUS AND METHOD FOR DISTINGUISHING BETWEEN ENERGIZED AND INDUCED VOLTAGES ON HIGH VOLTAGE POWER LINES

BACKGROUND OF THE INVENTION

1. Field of the Invention

This invention lies in the field of high voltage line indicators and, more particularly, indicators which discriminate between high voltage lines which are directly energized and those which carry induced voltage.

2. Description of the Prior Art

Safe practice for working or otherwise operating on high voltage electric utility power lines requires that such lines first be de-energized and then be grounded before linemen are permitted to work on them. However, before applying a ground connection to such a line conductor, it is necessary to determine reliably that the line has in fact been de-energized. Normal procedure following such de-energization is to check the line with a conventional static detector to determine whether there is a detected potential (voltage) above the system ground level. However, where the line being checked parallels one or more energized high voltage lines, voltages may be induced in an unenergized conductor. For example, where the unenergized line parallels another line normally carrying a substantially higher voltage than the unenergized line carries when it is energized, it is not at all unusual to find on such an unenergized line an induced voltage substantially of the amount that it would normally carry when in fact energized. Since such induced voltages may be of sufficient magnitude to produce indications on a static detector, the worker is often unable to determine whether the indication is caused by direct energization of the conductor or by a voltage induced thereon. Thus, there is a serious problem in determining whether a ground may be safely applied to the line which is thought to be de-energized.

In the invention set forth hereinbelow, the prior art difficulty has been overcome by indicating apparatus which distinguishes positively between an energized conductor and one that is carrying induced voltage only. It is to be noted that the prior art shows examples of potential indicators as such. See, for example, the patent to Huebner, U.S. Pat. No. 1,454,474. The potential indicator disclosed in the Huebner patent is an example of the prior art device discussed hereinabove. It is efficient in detecting the existence of the potential, or voltage on a line, but is not intended and is unable to give an indication as to whether such voltage is derived from direct energization or is derived by inducement from a nearby line. The invention disclosed and claimed in this application improves over such prior art by providing means for distinguishing between the energized and non-energized high voltage line and, accordingly, fulfills a long standing and very critical need in the electric power industry.

SUMMARY OF THE INVENTION

It is the primary object of this invention to provide apparatus for easily and reliably determining whether the voltage on a high voltage line is derived from direct energization or from inducement from external sources.

In accordance with this objective, there is provided an indicator for hot-stick application to a power line which, when connected between such line and ground, applies a high capacitance drain on the line and, by measurement of the resulting current, distinguishes positively between an energized line and one that is carrying induced voltage only. The device comprises a string of high voltage capacitors, connected in series, housed within a tube adapted to be connected at one end to the high voltage line, and a milliammeter which provides an indication of the current flow between the high voltage line and ground when the device is connected between such line and ground. When the apparatus of this invention is applied to an energized high voltage line, a relatively high drainage current is indicated. However, when applied to a line carrying induced voltage only, a current is observed which is sufficiently less such that it can be distinguished as representing an induced potential only.

DESCRIPTION OF THE PREFERRED EMBODIMENT

Figure 1:
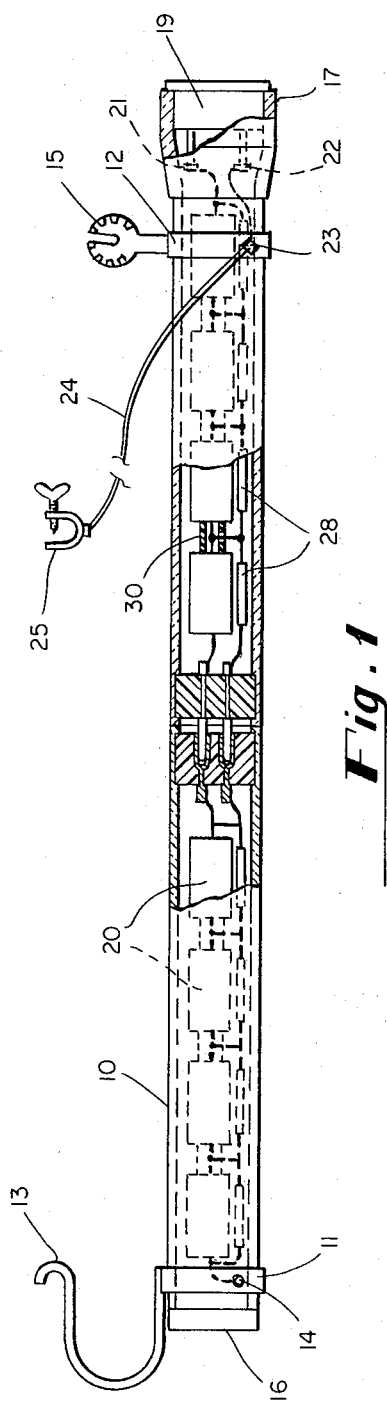
FIG. 1 is a schematic diagram of the apparatus of this invention.

Referring now to FIG. 1, there is shown a housing in the form of a tube 10, preferably constructed of glass-fiber material, and having respective conducting metal bands 11 and 12 positioned toward opposite ends thereof. Band 11 is connected to a hook extension 13, suitable for contacting a conductor to be checked for voltage. Band 12 is connected to a splined hot stick attachment 15 for receiving the spline of a conventional universal hot stick (not shown). A grounding cable 24 is connected to band 12 at terminal 23, and terminates at its opposite end in a clamp 25 suitable for connection to a ground point. Cable 24 suitably is insulated sufficiently such that it can be adjacent to other parallel power lines between ground and the line being checked. The tube 10 is closed at the conductor end by a cap 16 and at the opposite end by a head 17 of cup-like shape. The cap 16 is designed to provide a friction fit which normally holds it onto tube 10, but which permits expulsion of the cap (away from the worker) if gas builds up within tube 10 due to capacitor burn-out.

Within tube 10, there is provided a string of high voltage capacitors 20, connected in series. At the far end of the capacitor string, adjacent the conductor hook 13, the outer capacitor terminal is connected through a suitable aperture 14 in the tube 10 to band 11. At the opposite end of the capacitor string, a connection is made from the outer capacitor terminal to a first terminal 21 of an ammeter 19, which ammeter is connected from its opposite terminal 22 to terminal 23 on band 12. There is thus provided a complete circuit from the tested line to ground through the string of capacitors 20, the ammeter 19, and grounding cable 24.

Figure 2:
FIG. 2 is a perspective view of a spacing sleeve suitable for use between capacitors in the device of this invention.

In addition, each capacitor 20 is suitably combined with a conventional high voltage resistance 28, the respective ends of each resistor 28 being connected to the end leads of the respective associated capacitor so that they are in parallel combination. A resilient insulating split spacing sleeve 30, shown separately in FIG. 2, may be provided between each pair of capacitors for maintaining the desired capacitor spacing.

In practice, for use on 34 kV power lines (19.5 kV RMS phase line to ground) it has been found that a suitable value for each capacitance 20 is 0.047 MFD, and suitable value for each resistor 28 is 5 megohms. A convenient overall length of the apparatus for use on 34 kV lines is approximately 3 feet. It is to be noted that the indicator of this invention functions satisfactorily without inclusion of the resistors 28. However, use of these resistors serves to balance the voltages across the capacitors 20, and automatically drains off the device when it is removed from the high voltage line, such that any residual charge on the capacitors is dissipated, thus eliminating the possibility of shock. When the device is actually in use, the leakage current component through the resistors 28 is insignificant.

In application, the apparatus of this invention has been applied to a conductor of an energized nominal 34 kV line, resulting in a drainage current of about 40 mA, as indicated on the milliammeter 19. When applied to the same sort of line carrying an induced voltage only, of substantially the same voltage as detected by a static detector, the currents observed are considerably less, usually not more than the order of 10 mA. It is to be noted that the source of impedance for an induced voltage on such a line is so high that the current which results from shunting the conductor to ground through the indicator is extremely small. Accordingly, the high potential line which carries only an induced voltage is easily detected by the presence of a very small indicated current.

In practice, the apparatus of this invention can be utilized on any high potential line, which normally carries any high voltage. Since the normal indicator current can easily be determined for any given energization (e.g., 4, 13, 34 kV, 66 kV, etc.) the user of the device will know when, for any given line, the indicated current represents an energized line or an induced voltage line. As for the example of the 34 kV line above, the line carrying only induced voltage generally yields an indicated current of less than 25 percent of that expected for the energized line.

Figure 3:
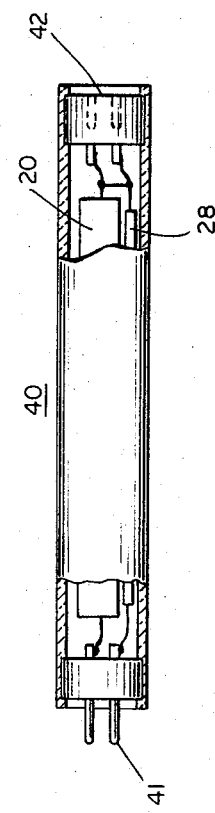
FIG. 3 is a fragmented schematic diagram showing the use of a capacitor module to adjust the capacitance of the apparatus as shown in FIG. 1.

In general usage on a utility network, it has been found that accurate readings require that the meter 19 be a direct reading, or "self-contained" meter, i.e., one with no rectifier. Rectified meters, perhaps because of the transient response when the apparatus is connected between the line and ground, do not provide accurate readings of the current passing through the series capacitors. Since the smallest range full scale direct meter which is commercially available is 0–50 mA, it is necessary that the circuit capacitance provided by the series capacitors 20 be high enough to permit appreciable use of the 50 mA range. In the example given above for the 34 kV line, the "energized" reading about 40 mA, or 80 percent of full scale. However, it is apparent that if the device is to be used on higher or lower voltage lines with the same meter, either the reading would be off the scale or would be too low for accurate detection. Accordingly, there is provided a means for adapting the apparatus for different lines. As seen in FIG. 3, the tube 10 may be comprised of component sections 40, each carrying a set number of capacitors 20 (with parallel resistors 28), and adapted so that additional sections may be inserted to decrease the total capacitance (by adding more capacitors in series), or sections may be taken out to increase the total capacitance. In the type of section 40 illustrated, male plugs 41 and female plugs 42 are provided for easy insertion or deletion of sections. However, this embodiment is exemplary only, and it is to be understood that any suitable construction may be adopted whereby the net effective capacitance can be changed. In this manner, the apparatus can be adjusted to provide an accurate reading for any power line encountered. An accurate reading is obtainable when the current of an energized line produces a substantially full scale reading, i.e., at least 50 percent of full scale.

I claim:

1. Apparatus for distinguishing between energized and induced high voltage lines, comprising:
   a. capacitance means for providing a net effective capacitance, said capacitance means comprising a plurality of capacitors in series, each such capacitor having a resistor connected in parallel therewith;
   b. current reading means, in series combination with said capacitor means, for indicating current flow through said capacitance means;
   c. first electrical connecting means, for connecting a first terminal of said series combination to a high voltage line;
   d. second electrical connecting means, for connecting a second terminal of said series combination to a system ground reference;
   e. said current reading means having a range adapted such that when said apparatus is connected between a high voltage line and system ground, there is provided a reliable indication whether or not said line is energized, said current reading means being a direct reading meter; and
   f. a housing for containing said apparatus, said housing having a cap at the end thereof adjacent to said first connecting means, said cap being adapted to be easily expelled from said housing upon generation of pressure within said housing.

* * * * *